United States Patent [19]

Cooper et al.

[11] 4,301,059

[45] Nov. 17, 1981

[54] COMPOSITIONS OF A POLYPHENYLENE ETHER RESIN AND AN AROMATIC ALKENYL RESIN THAT IS MODIFIED BY RUBBER PARTICLES IN THE FORM OF BUNDLES OF RUBBER FIBERS OF RUBBER SHEETS

[75] Inventors: Glenn D. Cooper; Arthur Katchman, both of Delmar, N.Y.

[73] Assignee: General Electric Company, Selkirk, N.Y.

[21] Appl. No.: 108,375

[22] Filed: Dec. 31, 1979

[51] Int. Cl.$^3$ .......................... C08K 7/14; C08L 61/04
[52] U.S. Cl. .......................... 260/42.18; 260/45.7 PH; 525/68
[58] Field of Search ............... 525/68; 260/42.18, 45.7

[56] References Cited

U.S. PATENT DOCUMENTS

| 3,383,435 | 5/1968 | Cizek | 525/86 |
| 3,639,506 | 2/1972 | Haaf | 525/68 |
| 3,976,725 | 8/1976 | Lee, Jr. | 525/68 |
| 4,097,549 | 6/1978 | Kruse | 525/86 |

OTHER PUBLICATIONS

"Toughening of Plastics"., Internation Conference 4-6 Jul. 1978; London, England; H. Keskkula.
Kruse, "Dispersed Rubber in a Polystyrene Matrix" paper presented at ACS Symposium, New Orleans (1977).
"Die Angewandte Chemie Makromolekulare Chemie", 58/59 (1977) pp. 175-198, Echte.
Argon, "Toughening of Plastics", pp. 16-1 to 16-8 (1978).

Primary Examiner—J. Ziegler
Attorney, Agent, or Firm—Morgan, Finnegan, Pine, Foley & Lee

[57] ABSTRACT

Novel thermoplastic molding compositions are described which are based on the combination of a polyphenylene ether resin and an alkenyl aromatic resin that is modified by rubber particles in the form of bundles of rubber fibers or rubber sheets.

15 Claims, No Drawings

COMPOSITIONS OF A POLYPHENYLENE ETHER RESIN AND AN AROMATIC ALKENYL RESIN THAT IS MODIFIED BY RUBBER PARTICLES IN THE FORM OF BUNDLES OF RUBBER FIBERS OF RUBBER SHEETS

BACKGROUND OF THE INVENTION

The term "polyphenylene ether resin" is descriptive of a well known group of polymers that may be made by a variety of catalytic and non-catalytic processes. By way of illustration, certain of the polyphenylene ethers are disclosed in Hay, U.S. Pat. Nos. 3,306,874 and 3,306,875, and in Stamatoff, 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ethers are found in Fox, U.S. Pat. No. 3,356,761; Sumitomo, U.K. Pat. No. 1,291,609; Bussink et al, U.S. Pat. Nos. 3,337,499; Blanchard et al, 3,219,626; Laakso et al, 3,342,892; Borman, 3,344,166; Hori et al, 3,384,619; Faurote et al, 3,440,217; and disclosures relating to metal based catalysts which do not include amines are known from patents such as Wieden et al, U.S. Pat. No. 3,442,885 (copper-amidines); Nakashio et al, U.S. Pat. No. 3,573,257 (Metal alcoholate or phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypophalite, and the like, in the presence of a complexing agent. Disclosures relating to non-catalytic processes, such as oxidation with lead dioxide, silver oxide, etc., are described in Price et al, U.S. Pat. No. 3,382,212. All of the above-mentioned disclosures are incorporated herein by reference.

Cizek, U.S. Pat. No. 3,383,435 describes compositions of polyphenylene ether resins and styrene resins, including rubber modified high impact styrene resins.

The rubber modified-high impact polystyrenes, that were described by the Cizek specification, have rubber particles that have a composite structure, with an outer shell of rubber enclosing polyhedral occlusions of polystyrene that are separated by a thin rubber membrane. These are called "salami" or "cellular" particles.

A different type of rubber modified polystyrene has been described by Kruse, U.S. Pat. No. 4,097,549 and in Die Angewandte Makromolekulare Chemie 58/59 1977 pp. 175–198 which are incorporated by reference. These rubber modified polystyrenes have the rubber moiety structured on different morphological forms comprising ordinary cellular forms, bundles of rubber fibers, rubber sheets and mixtures thereof. It has been found that when this type of improved rubber modified polystyrene is combined with a polyphenylene ether resin, the resulting compositions have equal or slightly higher impact strength than analogous compositions that are made with ordinary rubber modified high impact polystyrene having a higher content of rubber. This is quite surprising in view of the fact that the impact strength of the improved rubber modified polystyrene is inferior to the impact strength of the ordinary rubber modified high impact polystyrene. The polyphenylene ether composition that contain the improved rubber modified polystyrene also have higher distortion temperatures and better gloss. It has also been found that equivalent gloss can be obtained in a polyphenylene ether composition containing the improved rubber modified polystyrene as compared to a polyphenylene ether composition containing ordinary rubber modified polystyrene, at molding temperatures that are lower by approximately 25° F.

Accordingly, it is an object of this invention to provide a polyphenylene ether resin-alkenyl aromatic resin composition that has improved properties as compared to the prior art compositions.

It is also an object of this invention to provide a composition of a polyphenylene ether and an alkenyl aromatic resin that may be molded at lower temperatures.

DETAILED DESCRIPTION OF THE INVENTION

The novel compositions of the invention comprise:
(a) a polyphenylene ether resin; and
(b) a polymeric composition of
a polymer of at least one monoalkenyl aromatic monomer having dispersed therein, an amount sufficient to toughen said polymer, of a diene rubber, said rubber being dispersed as crosslinked rubber particles and being grafted with said monomer as polymer and having occluded therein said polymer, said particles having a weight average diameter of from 0.5 to 10 microns, said rubber being structured in a morphological form comprising aggregations of rubber fibers or aggregations of rubber sheets and mixtures thereof.

These polymeric compositions may be prepared by continuously polymerizing a solution of a monoalkenyl aromatic monomer and a diene rubber under catalytic conditions with back mixed agitation to about 10 to 50% conversion, thereafter discontinuing said back mixed agitation and continuing the polymerization of said solution until the monomer is substantially polymerized; then heating and separating said polymeric compositions from unpolymerized monomer.

The polyphenylene ether resins have structural units of the formula:

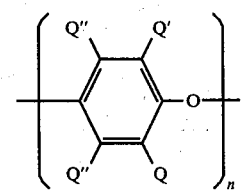

wherein Q is selected from the group consisting of hydrogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, $Q'$ and $Q''$ are the same as Q and in addition halogen with the proviso that Q and $Q'$ are both free of a tertiary carbon atom and n is an integer of at least 50.

The preferred polyphenylene ether resin is one where Q and $Q'$ are both hydrocarbon and $Q''$ are both hydrogen. An especially preferred polyphenylene ether resin is a poly(2,6-dimethyl-1,4-phenylene) ether resin having an intrinsic viscosity of about 0.40 dl/g–0.65 dl/g as measured in chloroform at 30° C.

The composition of the invention may comprise from 20 to 80 parts by weight, or more preferably 35 to 65 parts by weight of component (a) and from 80-20 parts by weight or more preferably from 65-35 parts by weight of component (b). Materials of the type comprehended by component (b) are commercially available from Dow Chemical as Dow 70510 and from Monsanto as Q301 polystyrene. In addition, materials such as that described in example 1 of U.S. Pat. No. 4,097,549 may be utilized.

If desired, reinforcing fillers may be added to the composition in reinforcing amounts such as from 1-40 parts by weight of fibrous glass or other fillers such as quartz, metal fibers, wollastonite or the fillers mentioned in U.S. Pat. No. 4,080,351, columns 3 and 4 which is incorporated by reference. Flame retardants such as those described in U.S. Pat. No. 3,833,535 which is incorporated by reference may be utilized in the compositions of the invention.

The compositions may be prepared by tumble blending powders, beads or extruded pellets of components (a) and (b) with or without suitable reinforcing agents, stabilizers, pigments, fillers, flame retardants, plasticizers or extrusion aids. The blends are extruded into a continuous strand, the strands are chopped into pellets and the pellets are molded to the desired shape.

All reference to "parts" in the Examples are parts by weight.

DESCRIPTION OF THE PREFERRED EMBODIMENT

EXAMPLE 1

Molding compositions are prepared from poly(2,6-dimethyl-1,4-phenylene) ether, rubber modified high impact polystyrene resin and triaryl phosphate*. Each composition also contained 3 phr of titanium dioxide; 1.5 phr polyethylene; 1 phr diphenyl decylphosphite; 0.15 phr zinc sulfide and 0.15 zinc oxide. The compositions were extruded in a twin screw extruder and molded into standard test preces using a screw injection molding machine. The compositions had the following ingredients:

*Kronitex 50-a triaryl phosphate with one or more of the aryl groups being mono-isopropyl phenyl, di-isopropylphenyl etc. with an average of about one isopropyl group per aromatic ring.

| poly(2-6-dimethyl-1,4-phenylene) ether* | Ordinary HIPS** | Improved HIPS*** | Triaryl Phosphate |
|---|---|---|---|
| 1.$^a$ | 50 | 50 | | 3 |
| 2. | 50 | | 50 | 3 |
| 3.$^a$ | 35 | 65 | | 7 |
| 4. | 35 | | 65 | 7 |

*PPO General Electric Co. IV of 0.5 dl/g in CHCl$_3$ at 30° C.
**Foster Grant 834
***Dow 70510
$^a$Controls The molding compositions were tested and were found to have the following properties:

TABLE I

| | Elong. (%) | T.Y. (psi) | T.S. (psi) | Izod (ft.lb/in.) | Gardner (in-lbs) | HDT (°F.) |
|---|---|---|---|---|---|---|
| 1.$^a$ | 61 | 9000 | 8300 | 3.7 | 175 | 246 |
| 2. | 52 | 9600 | 8400 | 3.9 | 175 | 251 |
| 3.$^a$ | 59 | 7100 | 7100 | 4.2 | 150 | 199 |
| 4. | 53 | 8000 | 7200 | 4.3 | 125 | 206 |

$^a$Control

The properties of the HIPS are as follows:

| | Improved HIPS | Ordinary HIPS |
|---|---|---|
| Rubber (%) | 8.4 | 9.2 |
| Number average particle diameter (microns) | 1.4 | 1.6 |
| Weight average particle diameter (microns) | 2.1 | 2.1 |
| Notched Izod Impact Strength (ft.ib/in.n.) | 1.9 | 2.5 |

EXAMPLE 2

The composition in Example 1 was molded into 2½"-×2½"×⅛" plaques at mold temperature of 130°, 155° and 180° F. Stock temperature was 520° F. for the 50:50 materials and 480° F. for the 35:65 compositions. Gloss (45°) was measured with the results listed in Table II. Compositions made with the improved polystyrene containing bundles of fibers and sheets of rubber had higher gloss that the control at all three mold temperatures, but the difference was greatest at low temperatures, as much as ten gloss units for 50:50 compositions in a mold at 130° F.

TABLE II

| | Composition | 130° mold | Gloss 155° mold | 180° mold |
|---|---|---|---|---|
| 1. | 50:50 | 45.7 | 53.8 | 59.0 |
| 2. | 50:50 | 55.0 | 58.9 | 61.6 |
| 3. | 35:65 | 55.6 | 57.3 | 62.0 |
| 4. | 35:65 | 59.4 | 62.2 | 64.0 |

EXAMPLE 3

The following compositions were prepared according to the procedure of Example 1. Compositions 5 and 6 contained 50 parts of poly(2,6-dimethyl-1,4-phenylene) ether; 50 parts of the rubber modified polystyrene; 3 parts titanium dioxide; 3 parts triaryl phosphate*; 1 part diphenyl decylphosphite; 1.5 parts polyethylene; 0.15 parts zinc sulfide and 0.15 parts of zinc oxide. Compositions 7 and 8 contained 35 parts of poly(2,6-dimethyl-1,4-phenylene) ether; 65 parts of the rubber modified polystyrene; 0.5 parts diphenyl decylphosphite; 3 parts titanium dioxide; 8 parts triaryl phosphate*; 1.5 parts polyethylene zinc sulfide and 0.15 parts zinc oxide. Properties are shown in Tables III and IV.
*Kronitex 50.

TABLE III

| HIPS | Elong. | T.Y. | T.S. | Izod | Gardner | HDT |
|---|---|---|---|---|---|---|
| 5. ordinary** | 86 | 9,800 | 8900 | 3.8 | 200 | 245 |
| 6. improved*** | 63 | 10,000 | 8400 | 3.8 | 200 | 249 |
| 7. ordinary** | 67 | 7,400 | 7000 | 4.4 | 90 | 200 |
| 8. improved*** | 53 | 7,600 | 7000 | 4.4 | 125 | 201 |

**Foster Grant 834
***Monsanto 0301

TABLE IV

| | 180° mold | Gloss 155° mold | 130° mold |
|---|---|---|---|
| 5. | 60.4 | 52.1 | 50.4 |
| 6. | 63.6 | 60.3 | 56.3 |
| 7. | 59.4 | 54.1 | 52.1 |
| 8. | 63.4 | 60.1 | 58.4 |

Obviously many variations will suggest themselves to those skilled in the art from the above detailed description without departing from the scope or spirit of the invention. It is, therefore, to be understood that changes may be made in the particular embodiments of the invention as defined by the appended claims.

We claim:

1. A thermoplastic molding composition which comprises:
   (a) a polyphenylene ether resin; and
   (b) a polymeric composition of
      a polymer of at least one monoalkenyl aromatic monomer having dispersed therein, an amount sufficient to toughen said polymer, of a diene rubber, said rubber being dispersed as crosslinked rubber particles and being grafted with said monomer as polymer and having occluded therein said polymer, said particles having a weight average diameter of from 0.5 to 10 microns, said rubber being structured in a morphological form comprising aggregations of rubber fibers, aggregations of rubber sheets or mixtures thereof.

2. A composition as defined in claim 1 wherein the polyphenylene ether has structural units of the formula:

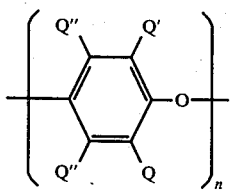

wherein Q is selected from the group consisting of hydrogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, Q' and Q'' are the same as Q and in addition halogen with the proviso that Q and Q' are both free of a tertiary carbon atom and n is an integer of at least 50.

3. A composition as defined in claim 2 wherein component (a) is 20 to 80 parts by weight of the composition and component (b) is 80 to 20 parts by weight of the composition.

4. A composition as defined in claim 3 wherein the polyphenylene ether resin, Q and Q' are hydrocarbon and both Q'' are hydrogen.

5. A composition as defined in claim 4 wherein the polyphenylene ether resin is a poly(2,6-dimethyl-1,4-phenylene) ether resin.

6. A composition as defined in claim 5 wherein component (b) is derived from a monoalkenyl aromatic monomer selected from the group consisting of styrene, α-methylstyrene, chlorostyrene, bromostyrene or mixtures thereof and a diene rubber selected from the group consisting of polybutadiene, polyisoprene, poly-2-chlorobutadiene and mixtures thereof.

7. A composition as defined in claim 5 wherein component (b) is derived from styrene and polybutadiene.

8. A composition as defined in claim 1 which includes a reinforcing amount of a reinforcing filler.

9. A composition as defined in claim 1 wherein the reinforcing filler comprises from 1–40 parts by weight of fibrous glass.

10. A composition as defined in claim 1 which includes a flame retardant amount of a flame retardant agent.

11. A composition as defined in claim 8 which includes a flame retardant amount of a flame retardant agent.

12. A thermoplastic molding composition which comprises:
   (a) a polyphenylene ether resin; and
   (b) a polymeric composition of
      a polymer of at least one monoalkenyl aromatic monomer having dispersed therein, an amount sufficient to toughen said polymer, of a diene rubber, said rubber being dispersed as crosslinked rubber particles and being grafted with said monomer as polymer and having occluded therein said polymer, said particles having a weight average diameter of from 0.5 to 10 microns, said rubber being structured in a morphological form comprising aggregations of rubber fibers, aggregations of rubber sheets or mixtures thereof said polymeric composition being prepared by continuously polymerizing a solution of a monoalkenyl aromatic monomer and a diene rubber under catalytic conditions with back mixed agitation to about 10 to 50% conversion; thereafter discontinuing said back mixed agitation and continuing the polymerization of said solution until the monomer is substantially polymerized; then heating and separating said polymeric composition from unpolymerized monomer.

13. A thermoplastic molding composition which consists essentially of:
   (a) 20 to 80 parts by weight of a poly(2,6-dimethyl-1,4-phenylene) ether resin;
   (b) from 80 to 20 parts by weight of a polymeric composition consisting essentially of a polymer of styrene monomer having dispersed therein, an amount sufficient to toughen said polymer, of a diene rubber, said rubber being dispersed as crosslinked rubber particles and being grafted with said monomer as polymer and having occluded therein said polymer, said particles having a weight average diameter of from 0.5 to 10 microns, said rubber being structures in a morphological form comprising aggregations of rubber sheets, aggregations of rubber fibers or mixtures thereof, said polymeric composition being prepared by continuously polymerizing a solution of styrene monomer and a diene rubber under catalytic conditions with back mixed agitation to about 10 to 50% conversion; thereafter discontinuing said back mixed agitation and continuing the polymerization of said solution until the styrene monomer is substantially polymerized; then heating and separating said polymeric composition from unpolymerized styrene monomer.

14. A composition as defined in claim 13 wherein component (a) is from 35–65 parts by weight of the composition and component (b) is from 65–35 parts of the composition.

15. A composition defined in claim 13 wherein the diene rubber is polybutadiene.

* * * * *